Aug. 10, 1926.  
J. G. DICKINSON  
1,595,504  
ATTACHMENT FOR MOWING MACHINES  
Filed Oct. 4, 1924 2 Sheets-Sheet 1

Aug. 10, 1926.

J. G. DICKINSON

ATTACHMENT FOR MOWING MACHINES

Filed Oct. 4, 1924

J. G. Dickinson, Inventor

By C. A. Snow & Co.

Attorneys

Patented Aug. 10, 1926.

1,595,504

UNITED STATES PATENT OFFICE.

JOHN G. DICKINSON, OF DENMARK, TENNESSEE.

ATTACHMENT FOR MOWING MACHINES.

Application filed October 4, 1924. Serial No. 741,750.

This invention relates to agricultural machines and more particularly to mowing machines, the primary object of the invention being to provide means for raking the hay from the seed pan usually carried by the cutter bar of the mower.

Another important object of the invention is to provide a device of this character which may be readily and easily attached to a mower and one which may be automatically operated when the mower is in operation.

A still further object of the invention is to provide means to adjust the stroke of the rake forming a part of the invention, to permit its use with various sized grain pans.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
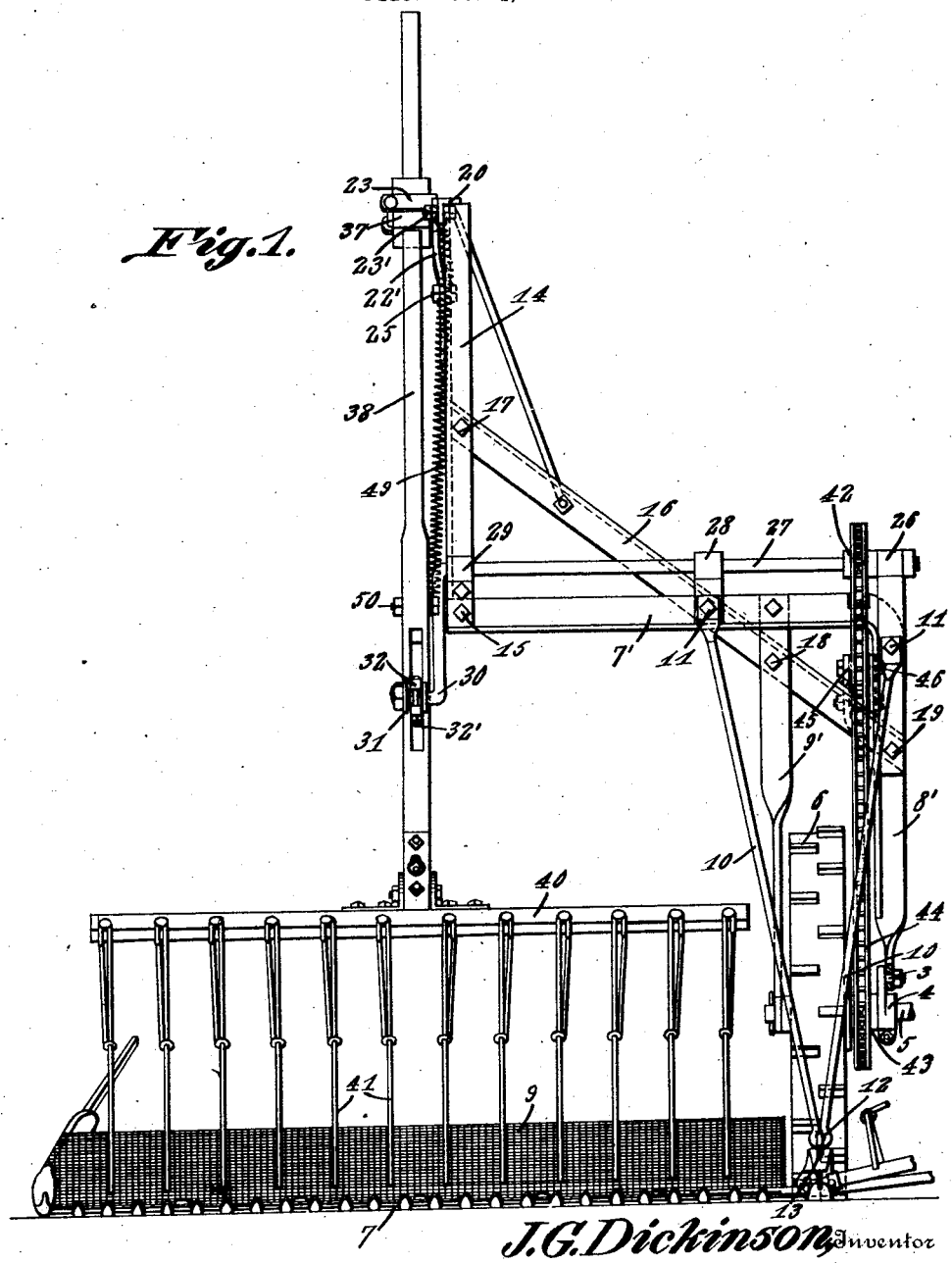
Figure 1 is a plan view disclosing the cutter bar of a mower and a raking attachment constructed in accordance with the invention.
Figure 2:
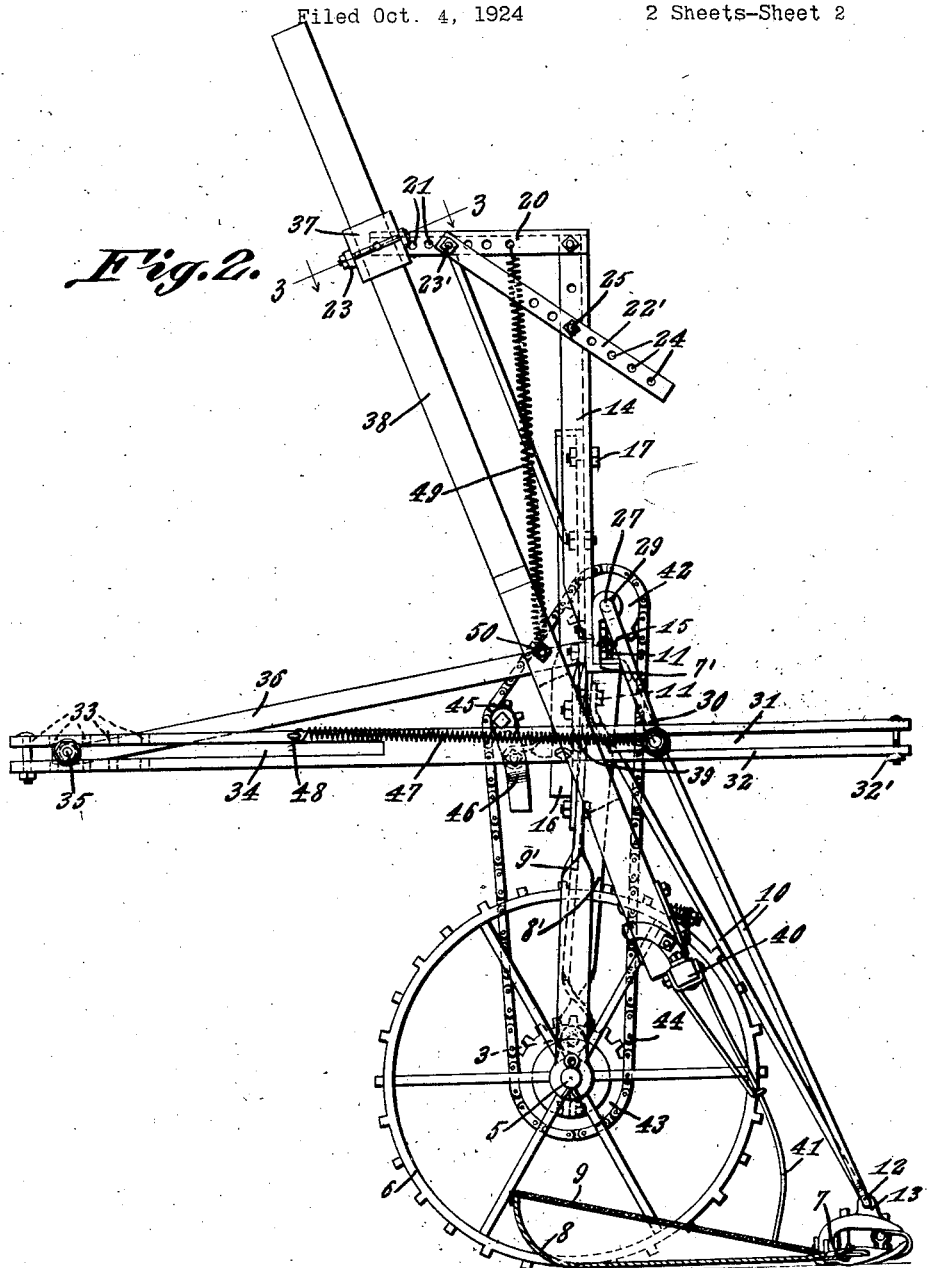
Figure 2 is an elevational view of a mower equipped with a raking device, the seed pan being shown in section.
Figure 3:
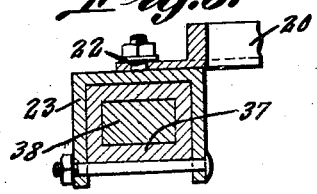
Figure 3 is a sectional view taken on line 3—3 of Figure 2.

Referring to the drawings in detail, the reference character 5 indicates the supporting axle of a mower on which the wheel 6 is mounted.

The cutter bar is indicated at 7 and carries the seed pan 8 which includes an upper screening member 9 over which the hay passes when it has been cut by the blades of the mower.

The rake which forms the important feature of the invention is supported by the horizontally disposed bar 7' which has a downwardly extended end portion 8' formed with a suitable opening to permit the same to be positioned over the stub axle 3 forming a part of the clamp 4 which is clamped around axle 5. Connected with the bar 7' is a vertical supporting bar 9' that is also formed with an opening to permit it to be positioned over the axle 5, so that the bar 9' may be held in an upright position.

Angularly disposed brace rods 10 connect with the bars 7' and 8' respectively at 11, while the intermediate portion of the brace rods is formed with an eye 12 to be received by the eye bolt 13 to secure the rods to the shoe.

The bar 14 extends vertically from one end of the bar 7' and is bolted to the bar 7' at 15, there being provided an angularly disposed bracing bar 16 connected to the bar 14 at 17 for holding the bar 14 in an upright position. Bolts 18 and 19 secure the lower end of the bar 16 to the members 8' and 9' to secure the lower end of the bar 16 against movement.

Extending rearwardly from the upper end of the bar 14 is a bar 20 formed with a plurality of openings 21 through which the bolt 22 may extend to pivotally connect the bearing supporting member 23 to the bar 20 and it will be seen that due to this construction, the bearing supporting member 23 may be adjusted to various positions to regulate the stroke of the rake bar operating therethrough, to permit seed pans of various sizes to be used.

In order that the bar 20 will be held in its positions of adjustment, an adjusting bar 22' is provided which has one end pivotally connected to the bar 20 at 23', the opposite end thereof being supplied with a plurality of openings 24 to accommodate bolt 25 for adjustably connecting the bar 22' to the bar 14.

Carried by the bar 8' is a bearing 26 in which is mounted the shaft 27 which is also mounted in bearings 28 and 29 that are secured to the bar 7'. One end of the shaft 27 is formed at right angles as at 30, providing a crank which has its extremity disposed in parallel relation with the shaft 27 where it extends through the elongated cut out portion 31 of the operating bar 32 or guide bar.

The side members of the cut out portion 31 are connected by the bolt 32'. The opposite end of the bar 32 is formed with a cut out portion 34 providing a guideway for the bolt 35 carried by the arm 36. The side members of the last mentioned cut out portion are connected by the bolts 33' positioned in the openings 33 formed in the guide bar, so that the stroke of the rake bar may be adjusted at the will of the operator. Positioned in the bearing supporting member 23 is a bearing 37 through which operates the rake bar 38 which has pivotal connection with the bar 32 at 39, the lower end of the rake bar 38 being supplied with the rake head 40 which has rearwardly curved tines 41 that move over the member 9.

Mounted on the shaft 27 to move therewith is a sectional sprocket wheel 42 that receives motion from the sprocket wheel 43 through the medium of the chain 44 so that as the wheel 6 is rotated, the sprocket 43 is also rotated operating the chain for rotating the shaft 27. An idle wheel 45 is supported at 46 and acts to compensate for the slack in the chain 44.

The coiled spring 47 has one end thereof connected to the bar 32 at 48, the opposite end of the spring being connected with the crank arm to tension the movement of the crank arm and the bar 32. The coiled spring 49 has one end connected with the bar 20 while the opposite end thereof connects with the rake bar 38 at 50 so that the movement of the crank in operating the bar 38 will be tensioned to insure an even movement.

From the foregoing it will be obvious that when the wheel 6 is moved in a clockwise direction, the crank arm 30 is also moved in a clock-wise direction to the end that the bar 32 is moved vertically. Since the rake bar 38 has pivotal connection with the bar 32 the rake bar together with the rake supported thereon will move, the rake head moving in a substantially circular path directly over the member 9 to scrape or rake material over the seed pan.

I claim:—

1. An attachment for mowers carrying grain pans including a supporting axle, a vertical bar mounted on the axle, an adjustable rearwardly extending bar mounted at the upper end of the vertical bar, a bearing pivotally supported by the adjustable rearwardly extending bar, a rake bar slidable through the bearing, tines carried at the lower end of the rake bar and adapted to sweep the grain pan, and means for transmitting vertical and swinging movement to the rake bar.

2. An attachment for mowers carrying grain pans including a supporting axle, a vertical bar, a horizontal bar mounted at the upper end of the vertical bar, a pivoted bearing adjustably supported on the horizontal bar, a rake bar operating through the bearing, tines carried by the rake bar and adapted to sweep the grain pan, and means for swinging the rake bar to move the tines over the seed pan.

3. An attachment for mowers carrying grain pans including a wheel-supported frame, a vertical bar extending from the frame, a bar extending rearwardly from the upper end of the vertical bar, means for adjusting the last mentioned bar with respect to the vertical bar, a rake bar, a bearing carried by the rearwardly extended bar, said rake bar adapted to move through the bearing, a bar having cut out portions formed in its ends, an arm connecting the rake bar and last mentioned arm and having a bolt extending through the cut out portion at one end of the last mentioned bar, and a crank arm having one end extending through the opposite cut out portion to transmit movement to the last mentioned bar to move the arm and rake bar.

In testimony that I claim the foregoing as my own, I have hereto affixed my signature.

JOHN G. DICKINSON.